United States Patent Office 3,202,282
Patented Aug. 24, 1965

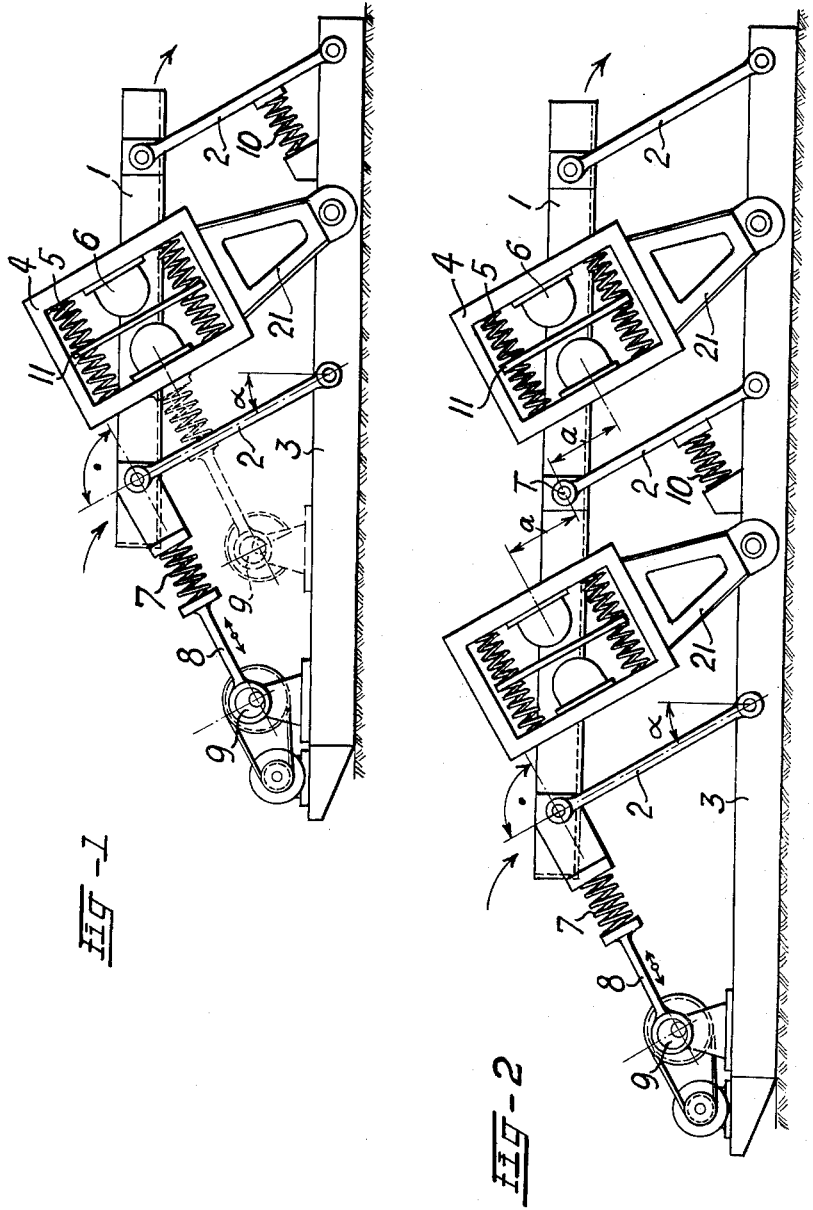

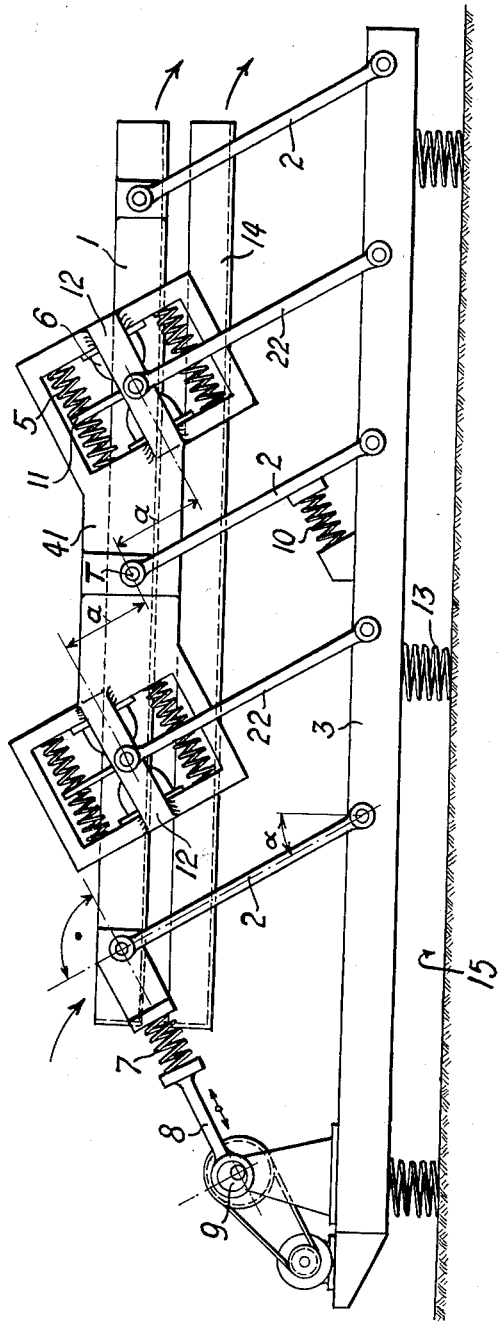

3,202,282
VIBRATORY SCREEN
Jaroslav Růžička, 74 Krizikovova,
Prague 10, Czechoslovakia
Filed Apr. 3, 1962, Ser. No. 184,754
Claims priority, application Czechoslovakia, Apr. 8, 1961,
2,142/61
8 Claims. (Cl. 209—365)

The present invention relates to a vibratory screen or sieve operating in resonance and more specifically to a device of this type whose stiffness characteristic is non-linear.

Known vibratory screens or sieves having a non-linear characteristic curve include a massive supporting frame which is approximately three times heavier than the casing carrying the screen.

During operation, not only the screen casing but also the heavy carrier frame oscillates, the magnitude of the respective oscillations being inversely proportional to the masses of said components. In such machines, the actuating forces are transmitted through a resilient mounting to the foundation or to the surroundings in an objectionable manner. A further disadvantage is the considerable weight of the machine.

The present invention aims at overcoming the aforesaid disadvantages by an improved arrangement, which is substantially lighter in weight and in which the transmission of actuating forces to the foundations of the machine is reduced to a minimum.

According to the primary feature of the invention, balance frames are provided at both sides adjacent the center of gravity of the screen casing, the common center of gravity of the balancing frames being identical with the center of gravity of the screen casing. The balance frames engage the screen casing by means of springs having a linear characteristic and bearing against lateral brackets on the screen casing and by means of resilient abutment members affecting the relative movement of frames and casing in a non-linear manner.

When the length of the screen casing is considerable, two or more pairs of such balance frames may be provided and spaced apart in such a way that their centers of gravity are located symmetrically to, and at an equal distance from, the center of gravity of the screen casing.

The crank or eccentric drive producing the vibrations is attached either to the screen casing or to its balancing frame. The vibrating system is adjustable to allow for various angles of inclination of the struts on which the casing is mounted, and the vibration drive is adjustable to a position in which its connecting rod is substantially perpendicular to the carrier struts. Two or more pairs of said balancing frames can be rigidly joined together to form common balancing frames which are arranged at either side of the screen casing and may be connected in a transverse direction, their common center of gravity being identical with the center of gravity of the screen casing. The common balancing frames are mounted on balancing struts secured at the top to a cross-beam provided in the frame and at the bottom to the supporting frame of the machine.

In order that the invention may be clearly understood and readily carried into effect it will be described hereinafter with reference to specific embodiments illustrated in the attached drawing in which:

FIGURE 1 shows a vibratory screen of the invention in side elevational view;

FIGURE 2 is a similar view of a modified screen of the invention and

FIGURE 3 is a similar view of a further modification.

Referring first to FIGURE 1, the screen casing 1 is supported on two pairs of inclined struts 2 pivoted to a supporting frame 3 of the machine. Further mounted on the supporting frame 3 by means of balancing struts 21 are balancing frames 4 arranged on either side of the screen casing 1 in such a way that their common center of gravity coincides with the center of gravity of the screen casing 1. The balancing frames 4 are each provided with springs 5 having a linear characteristic curve and bearing on lateral brackets 11 of the screen casing 1 and with resilient abutment members 6 which limit the amplitude of oscillation of the frames 4 relative to the casing 1 in a non-linear manner. Vibrating movement of the screen casing 1 is derived from a crank drive or eccentric drive 9 mounted on the supporting frame 3 and is transmitted from the drive to the casing by a connecting rod 8 and a resilent member 7, which is secured either to the screen casing 1 or to the balancing frames 4 (shown in broken lines). The vibration system is urged toward a position of equilibrium by a spring 10. The direction in which the material is conveyed is indicated by arrows.

In a screen according to FIGURE 2 which is longer than that shown in FIGURE 1, two or more pairs of balancing frames 4 may be provided. They have to be positioned in such a way that their centers of gravity are located symmetrically with respect to the center of gravity T of the screen casing 1 and spaced at equal distances $a$ therefrom.

As the disclosed screens operate in resonance, the screen casing 1 and the balancing frames 4 vibrate in opposition phase relationship, and the connecting rod 8 transmits but very small unbalanced forces to the supporting frame 3. If the masses of the screen casing 1 and of the balancing frames 4 are identical, their amplitudes of vibration are equal but out of phase with each other. A substantial reduction in the weight of the machine is thus possible.

It is a further advantage of the invention that the screen casing 1 along with the balancing frames 4 can be tilted about the pivots of the struts 2 on the supporting frame 3 of the machine. Thus the angle alpha by which the carrier struts 2 are inclined against the vertical, can easily be changed and the machine can be adapted to the properties of different materials screened. In this event it is necessary only to change the position of the drive 9 so as to maintain the substantially perpendicular position of the connecting rod 8 in relation to the struts 2.

FIGURE 3 shows a further modification of the vibratory screen of the invention in which two rigidly connected balancing frames 41 are arranged on each side of a screen casing 1 so that the centers of gravity of the frames and of the casing coincide. The balancing frames 41 may also be connected in a transverse direction. They are guided by balancing struts 22 which are pivoted at the top to cross-beams 12 of the balancing frames 41 and, at the bottom, to the supporting frame 3 of the machine. A second screen 14 is suspended from the rigidly connected balancing frames 41. As shown in FIG. 3, the supporting frame 3 of the machine is mounted on soft springs 13 which are interposed between the frame 3 and a foundation 15.

When the disclosed device operates in resonance, the resilient mounting is not necessary and the springs 13 may be dispensed with.

It should be understood that the foregoing disclosure relates only to preferred embodiments of the invention, and that numerous modifications or alterations may be made therein without departing from the spirit and scope of the invention set forth in the appended claims.

What I claim is:

1. A vibratory screen operating in resonance and comprising:
 (a) a supporting frame;
 (b) a screen casing;
 (c) at least two pairs of inclined struts pivoted at one end to said supporting frame and at the other end to the screen casing;
 (d) a vibration drive mounted on the supporting frame;
 (e) a connecting rod attached to said vibration drive;
 (f) a resilient connection member having one end portion attached to said connecting rod and another end portion operatively connected to the screen casing;
 (g) a plurality of balancing frame means,
  (1) at least one balancing frame means being arranged at each side of the screen casing and mounted on carrier struts pivoted to said supporting frame,
  (2) the common center of gravity of said balancing frame means coinciding with the center of gravity of said screen casing;
 (h) springs having linear characteristic curves on each balancing frame means;
 (i) a plurality of lateral bracket means mounted on said screen casing,
  (1) said springs bearing with one end on the associated balancing frame means and with the other end on a respective lateral bracket means, said ends of the springs being spaced in a predetermined direction,
  (2) whereby each frame means is resiliently connected to a respective bracket means for reciprocating movement relative thereto in said direction toward and away from a position of equilibrium; and
 (j) resilient non-linear abutment members interposed between each bracket means and the associated frame means for limiting said movement.

2. A screen as set forth in claim 1, further comprising
 (k) a foundation;
 (l) resilient means mounted between said supporting frame and said foundation for carrying the supporting frame; and
 (m) a resilient strut actuating member interposed between said supporting frame and one of said struts, said actuating member urging the associated strut into a position of predetermined inclination relative to said supporting frame.

3. A screen as set forth in claim 1 wherein at least two pairs of balancing frame means are arranged with their respective centers of gravity positioned symmetrically with respect to, and spaced at equal distances from, the center of gravity of the screen casing.

4. A screen as set forth in claim 1 wherein said other end portion of said resilient connecting member is fixedly attached to one of said balancing frame means.

5. A screen as set forth in claim 1 wherein said carrier struts and said connecting rod are elongated, and the connecting rod is substantially perpendicular to the carrier struts.

6. A screen as set forth in claim 1 wherein pairs of said balancing frame means are rigidly connected to form common balancing frames arranged on both sides of the screen casing, the common center of gravity of said common balancing frames coinciding with the center of gravity of the screen casing, said balancing frames being mounted on a plurality of balancing struts each having two ends respectively secured to a balancing frame and to the supporting frame.

7. A screen as set forth in claim 1 wherein pairs of said balancing frame means are rigidly connected to form common balancing frames arranged on both sides of the screen casing, the common center of gravity of said common balancing frames coinciding with the center of gravity of the screen casing, said common balancing frames being transversely connected and being mounted on a plurality of balancing struts each having two ends respectively secured to a balancing frame and to the supporting frame.

8. A screen as set forth in claim 1 wherein pairs of said balancing frame means are rigidly connected to form common balancing frames arranged on both sides of the screen casing, the common center of gravity of said common balancing frames coinciding with the center of gravity of the screen casing, said balancing frames being mounted on a plurality of balancing struts, each balancing strut having two end portions respectively secured to a balancing frame and to the supporting frame, and a second screen casing in superposed relationship to said first mentioned screen casing, said second screen casing being suspended on the rigidly connected balancing frames.

References Cited by the Examiner

UNITED STATES PATENTS

| 2,154,361 | 4/39 | Schieferstein | 74—20 |
| 2,255,820 | 9/41 | Schieferstein | 74—87 |
| 2,653,702 | 9/53 | Linke | 198—220 |
| 2,701,061 | 2/55 | Kluge | 209—330 |
| 2,830,696 | 4/58 | Musschoot | 198—220 |
| 2,974,798 | 3/61 | Ruzicka | 209—365 |
| 2,978,104 | 4/61 | Muller | 209—365 |

FOREIGN PATENTS

| 725,833 | 8/36 | Germany. |
| 698,223 | 10/53 | Great Britain. |

HARRY B. THORNTON, *Primary Examiner.*

GEORGE D. MITCHELL, HERBERT L. MARTIN, *Examiners.*